US007014764B2

(12) United States Patent
Ackermanns et al.

(10) Patent No.: US 7,014,764 B2
(45) Date of Patent: Mar. 21, 2006

(54) DEVICE FOR RECEIVING AND SEPARATING CHIPS CREATED BY MACHINE-TOOLS AND COOLANT (SEALANT)

(75) Inventors: Leo J. P. Ackermanns, Schin op Geul (NL); Rimmond H. B. Souren, Meersen (NL)

(73) Assignee: Mayfran International B.V., Landgraaf (NL)

( * ) Notice: Subject to any disclaimer, the term of this patent is extended or adjusted under 35 U.S.C. 154(b) by 122 days.

(21) Appl. No.: 10/492,486

(22) PCT Filed: May 19, 2003

(86) PCT No.: PCT/EP03/05244

§ 371 (c)(1),
(2), (4) Date: Apr. 9, 2004

(87) PCT Pub. No.: WO03/099512

PCT Pub. Date: Dec. 4, 2003

(65) Prior Publication Data
US 2004/0245149 A1    Dec. 9, 2004

(30) Foreign Application Priority Data
May 24, 2002   (DE) ............................... 102 23 294

(51) Int. Cl.
*B23Q 11/00*       (2006.01)
*B01D 36/04*       (2006.01)
*B01D 33/073*      (2006.01)
(52) U.S. Cl. ...................... 210/297; 210/298; 210/402; 210/380.3; 210/497.01
(58) Field of Classification Search ................ 210/297, 210/298, 402, 380.3, 497.01
See application file for complete search history.

(56) References Cited

U.S. PATENT DOCUMENTS

| | | | | |
|---|---|---|---|---|
| 4,145,288 A | * | 3/1979 | Crowe | 210/111 |
| 4,147,635 A | * | 4/1979 | Crowe | 210/401 |
| 4,159,948 A | * | 7/1979 | Crowe | 210/111 |
| 4,735,730 A | * | 4/1988 | Bratten | 210/741 |
| 4,746,444 A | * | 5/1988 | Creps | 210/803 |
| 5,328,611 A | * | 7/1994 | Lenhart | 210/393 |
| 5,603,846 A | * | 2/1997 | Uchiyama et al. | 210/784 |

(Continued)

FOREIGN PATENT DOCUMENTS

JP    2000 202215 A    7/2000

(Continued)

OTHER PUBLICATIONS

International Search Report PCT/EP 03/05244 dated Aug. 12, 2003.

*Primary Examiner*—Thomas M. Lithgow
(74) *Attorney, Agent, or Firm*—Calfee, Halter & Griswold LLP

(57) ABSTRACT

A device for receiving and separating chips and coolant collecting on machine tools, having a filter drum (12) that has an internal bearing ring (13) on each of its two ends, which each engage in an external bearing ring (16) so that they rotate together, spring elements (19), which run parallel to the axis of the filter drum (12), are provided which are supported on one side on the internal bearing ring (13) and on the other side on the external bearing ring (16), each of the external bearing rings (16) is seated in a bearing shell (23, 24), which is fixed to the housing, and is supported on it in the axial direction, and sealing elements (17) are provided between each of the internal bearing rings (13) and the external bearing rings (16).

7 Claims, 4 Drawing Sheets

U.S. PATENT DOCUMENTS

Figure 8:
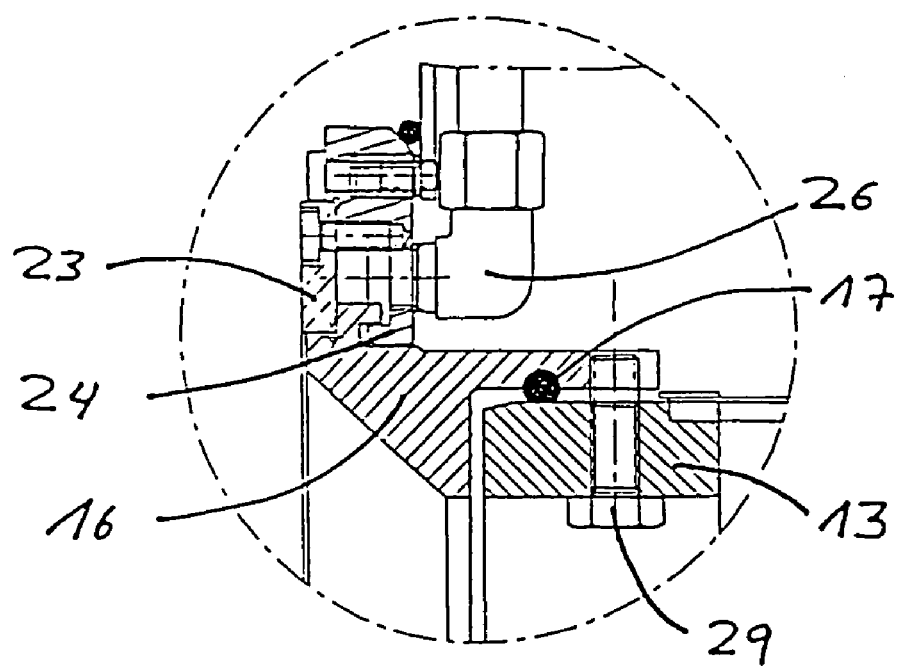

| | | | |
|---|---|---|---|
| 5,849,183 A | * 12/1998 | Ota et al. | 210/168 |
| 5,871,643 A | 2/1999 | Ota | |
| 6,093,315 A | * 7/2000 | Croket | 210/168 |
| 6,117,339 A | * 9/2000 | Croket | 210/780 |
| 6,332,983 B1 | 12/2001 | Tashiro et al. | |
| 6,475,377 B1 | * 11/2002 | Fox et al. | 210/90 |

FOREIGN PATENT DOCUMENTS

| | | |
|---|---|---|
| JP | 2000 300914 A | 10/2000 |
| JP | 2002 102608 A | 4/2002 |

* cited by examiner

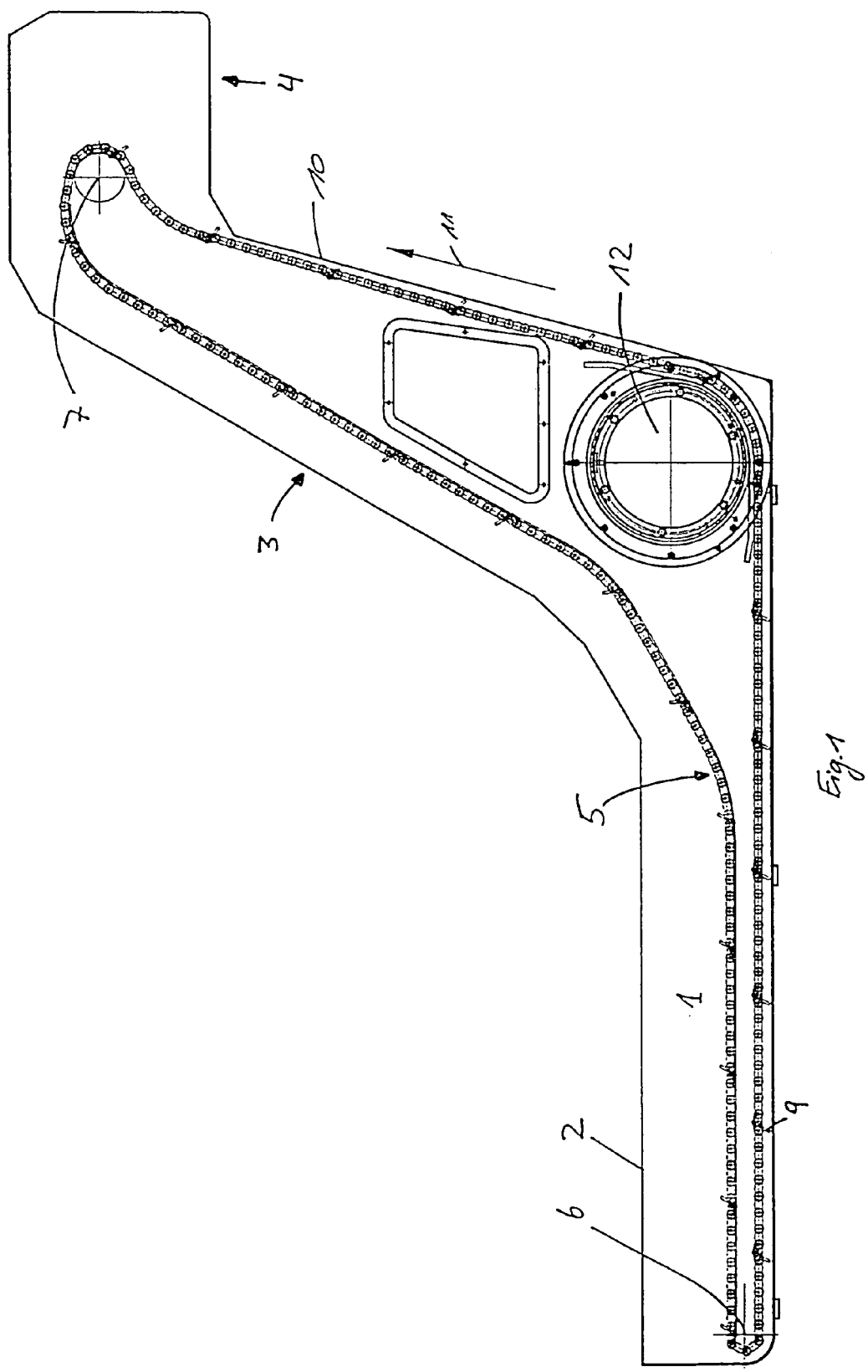

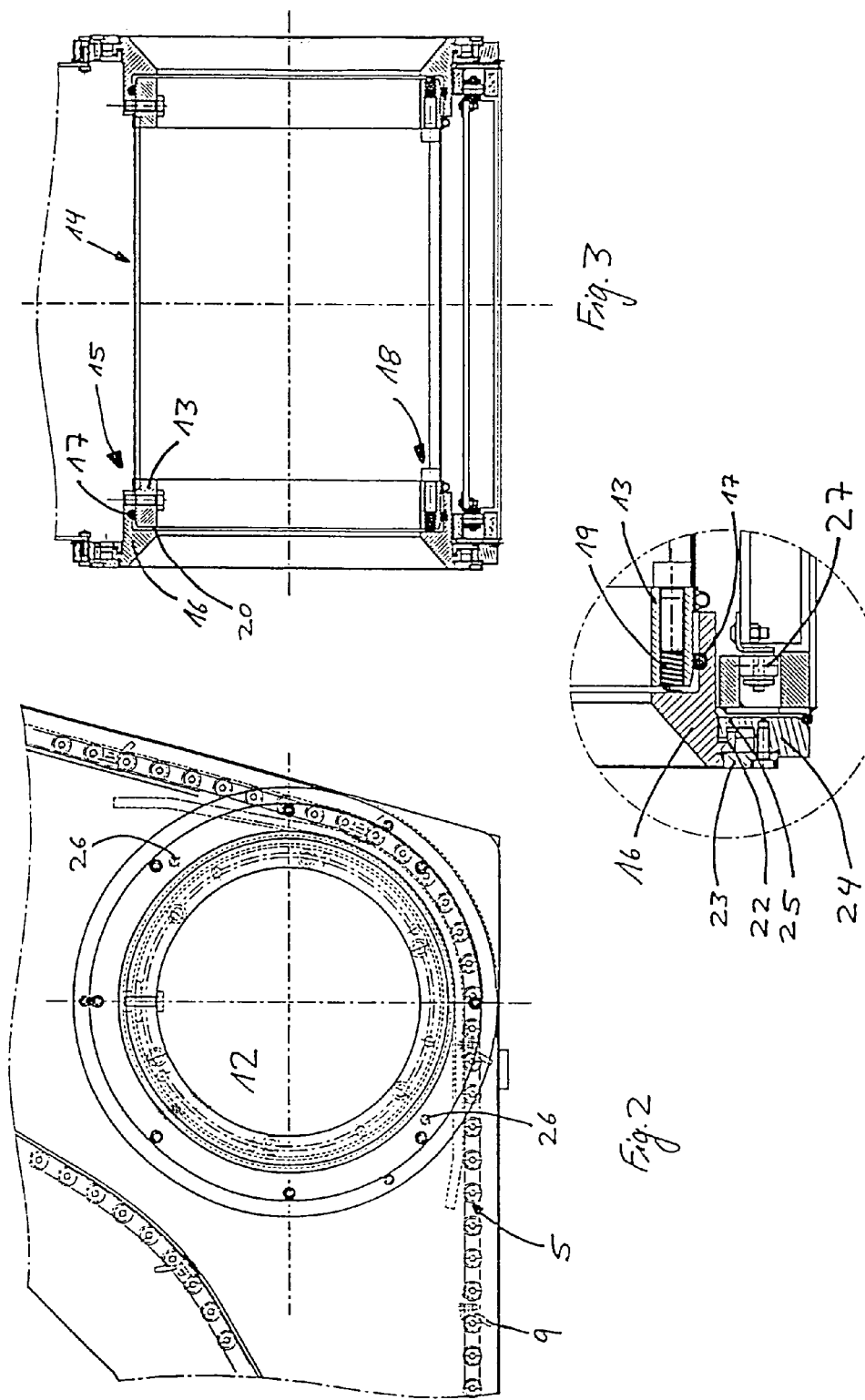

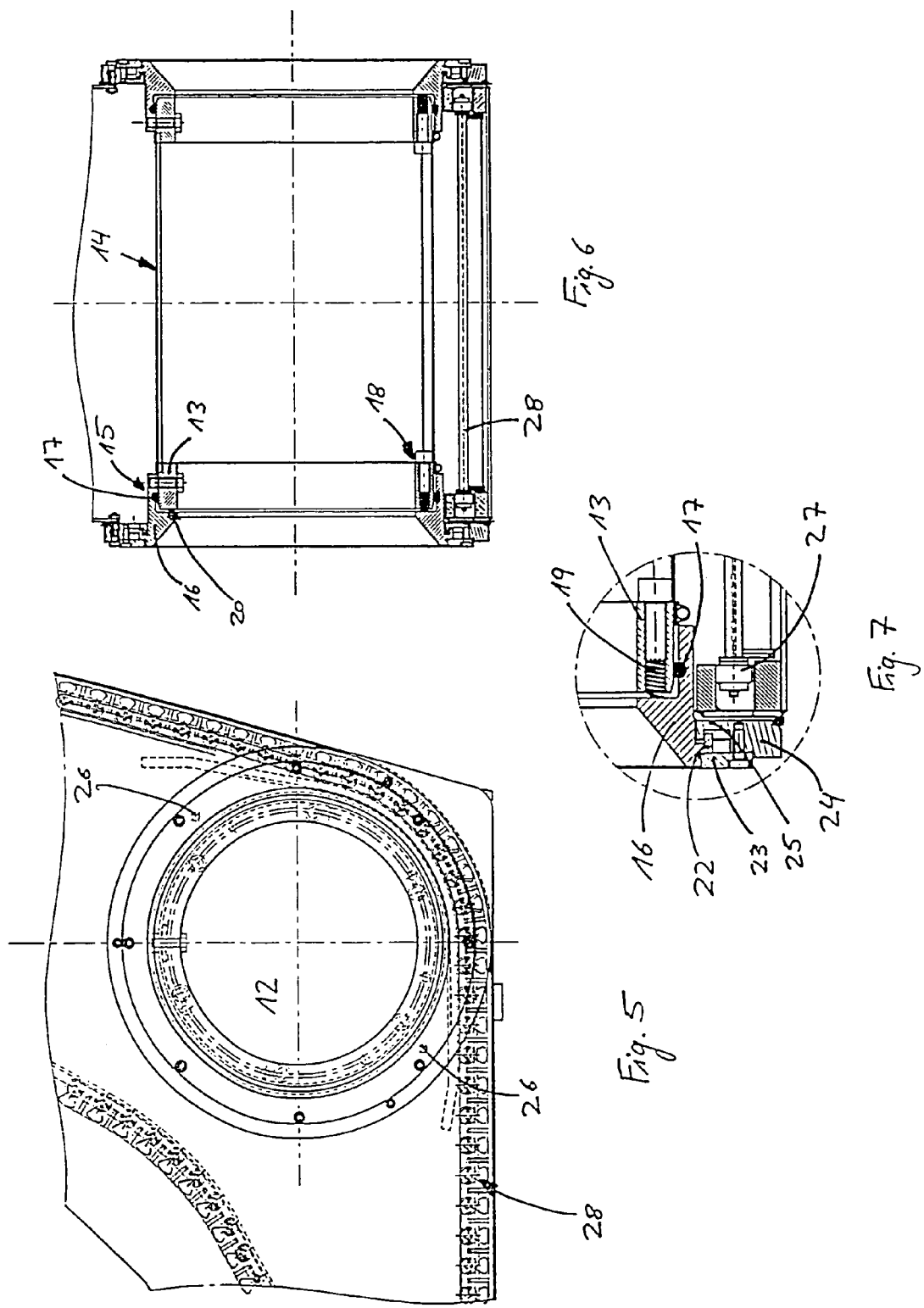

DEVICE FOR RECEIVING AND SEPARATING CHIPS CREATED BY MACHINE-TOOLS AND COOLANT (SEALANT)

The present invention relates to a device for receiving and separating chips and coolant collecting on machine tools, the coolant being returned for reuse and the chips being removed, having a receiving tank to receive the chips and the coolant, a rising guide section adjoining the receiving tank, an elevated discharge section adjoining the guide section, a chain-like closed transport element, which, at least in the region receiving the chips and the coolant and in the discharge section, is guided over deflection elements, at least one of which is coupled to a rotary drive, and a rotatably mounted filter drum, which is in drive connection to the transport element.

The bearings of such a filter drum are also necessarily subjected to axial stress and, as a consequence, are also always subject to wear.

The object of the present invention is therefore, above all, to reduce the wear occurring through axial bearing load and lower the requirements on the elements cooperating in the axial direction in a device of the type initially described.

This object is achieved according to the present invention in that the filter drum has an internal bearing ring on each of its two ends, each of which engages in an external bearing ring so that they rotate together, spring elements, which run parallel to the axis of the filter drum, are provided which are supported on one side on the internal bearing ring and on the other side on the external bearing ring, each of the external bearing rings is seated in a bearing shell, which is fixed to the housing, and is supported on it in the axial direction, and sealing elements are provided between each of the internal bearing rings and the external bearing rings.

Slight tolerance deviations between the internal and external bearing rings may be compensated by the arrangement of spring elements here.

In this case, the spring elements are preferably seated in a bore of the internal bearing ring and act on a face of the respective external bearing ring. Sealing elements between these two bearing rings prevent unfiltered coolant from being able to pass into the clean region by going around the filter. The spring pressure on the external bearing ring is transmitted in the axial direction onto the bearing shell, which is fixed to the housing, i.e., into a zone in which the radial surfaces slide on one another and wear occurs. The spring pressure acting on the external bearing ring causes compensation in the event of this type of wear.

The device according to the present invention may be implemented in such a way that each of the external bearing rings forms a labyrinth seal with the bearing shell, which is fixed to the housing. For this purpose, it is expedient for the bearing shell, which is fixed to the housing, to be implemented in multiple parts. In addition, an annular sealing element may be arranged in the course of the labyrinth seal to further promote sealing.

In addition, it is possible to prevent the escape of unfiltered coolant into the clean region by applying filtered coolant under excess pressure to the seal from the outside, so that escape of unfiltered coolant to the outside, and therefore into the region of the filtered coolant, is counteracted very reliably. Furthermore, this prevents chips, which produce increased wear of the bearing, from being washed into the bearing with the unfiltered coolant penetrating into the bearing.

To prevent deposits in the inside of the filter drum, it may be expedient for the inner diameter of the internal bearing ring to be tailored to the smallest internal diameter of the external bearing ring and the internal diameter of the filter drum.

In the following, several embodiments of the device according to the present invention are described with reference to the drawing.

FIG. 1: shows a schematic side view of a device of the type described here,

FIG. 2: shows a detail view of a filter drum connected to a scraper chain,

FIG. 3: shows an axial section through the filter drum,

FIG. 4: shows a detail view of the bearings of the filter drum shown in FIGS. 2 and 3, FIG. 5: shows a detail view of a filter drum connected to a hinged belt conveyor, FIG. 6: shows an axial section through the filter drum shown in FIG. 5, FIG. 7: shows a detail section concerning the bearings of the filter drum shown in FIGS. 5 and 6, and FIG. 8: shows a detail section of bearing ring and pressure connection.

FIG. 1 shows the side view of an embodiment of the device according to the present invention having a receiving tank 1, which is open on top and receives the chips and coolant collecting on the machine tools. This receiving tank has an overflow edge 2. A rising guide section 3, which transits into an elevated discharge section 4, adjoins the receiving tank.

A scraper belt, guided on both sides by rollers, is provided here as a transport element. This scraper belt is guided around a lower deflection element 6 on the end of receiving tank 1 and runs around an upper deflection element 7, which is coupled to a drive, not shown, in the region of discharge section 4. The scraper belt carries scraper elements 9 arranged at intervals, which project downward in the region of the lower conveyor section, i.e., in the direction toward the bottom of receiving tank 1 and/or toward side wall 10 of rising section 3. The transport direction of scraper belt 5 is indicated by arrow 11.

A filter drum 12 is provided which is rotatably mounted in the housing of the device. The two ends of filter drum 12 are implemented as identical mirror images of one another.

They have an internal bearing ring 13, which carries filter covering 14 and engages axially outward in a shoulder seat 15 of an external bearing ring 16. Internal bearing ring 13 is therefore partially overlapped by shoulder seat 15 of external bearing ring 16. A sealing ring 17 is provided in the region of this overlap, which prevents unfiltered coolant from passing into the inside of the drum filter in the region of this overlap.

Internal bearing ring 13 is connected to external bearing ring 16 in the region of shoulder seat 15, which ensures that both bearing rings always rotate together, and therefore relative movements do not arise in the region of shoulder seat 15. Sealing ring 17 is therefore only statically stressed.

Multiple bores 18, which run parallel to the axis of drum filter 12, are provided in internal bearing ring 13, in each of which coil springs 19 are seated, which press against face 20 of external bearing ring 16. This has the consequence that external bearing ring 16 performs a pressure against external element 23 of the bearing shells mounted in the housing of the device via angular section 22 provided on its external axial edge. Occurrences of wear must be expected here in the course of time between angular section 22 and external element 23 of the bearing shells. Such occurrences of wear are compensated through the axial pressure performed by coil springs 19 without anything further.

External element 23 of the bearing shell is connected to an internal element 24, which, in its radially internal region, has an edge-shaped profile 25 which engages in the angular section of external bearing ring 16. Therefore, a labyrinth seal, which prevents the escape of unfiltered coolant, is formed on one side by the cooperation of external bearing element 23 and internal bearing element 24, and external bearing ring 16 with its hook-shaped angular section 22. This may be encouraged if filtered coolant is passed through the course of the seal in the region of the bearing. External bearing ring 16 is expanded conically toward the outside and its internal diameter is tailored to that of internal bearing ring 13 and the tension of the drum seal.

In the embodiment illustrated, a scraper belt 5 is provided which is guided on both sides via rollers 27.

The embodiment shown in FIGS. 5 to 7 differs from that previously described only in that a hinged belt conveyor 28 is provided in this case, which is also supported on both edges via rollers 27.

FIG. 8 shows internal bearing ring 13, which engages via screw 29 in external bearing ring 16 so that they rotate together. The bearing shell, which is fixed to the housing, and which is formed from internal bearing element 24 and external bearing element 23, has a pressure connection 26, via which the labyrinth seal formed from external bearing ring 16 and the bearing shell, which is fixed to the housing, is washed with filtered coolant.

LIST OF REFERENCE NUMBERS 1 receiving tank
2 overflow edge
3 guide section
4 discharge section
5 scraper belt
6 deflection element
7 upper deflection element
8 -
9 scraper elements
10 side wall
11 arrow
12 filter drum
13 internal bearing ring
14 filter covering
15 shoulder seat
16 external bearing ring
17 seal
18 bore
19 coil springs
20 face
21 -
22 angular section
23 external bearing element
24 internal bearing element
25 edge-shaped profile
26 pressure connection
27 roller
28 hinged belt conveyor
29 screw

What is claimed is:

1. A device for receiving and separating chips and coolant collecting on machine tools, the coolant being returned for reuse and the shavings being removed, comprising:
   a receiving tank to receive the chips and the coolant;
   a rising guide section adjoining the receiving tank;
   an elevated discharge section adjoining the guide section;
   a chain-like closed transport element, which, at least in the region receiving the chips and the coolant and in the discharge section, is guided over at least first and second deflection elements, at least one of which is coupled to a rotary drive; and
   a filter drum rotatably mounted in a housing, which is in drive connection with the transport element, wherein:
      the filter drum comprises an internal bearing ring on each of its two ends, each of which engages in an external bearing ring so that they rotate together;
      spring elements, which run parallel to the axis of the filter drum, are provided which are supported on one side on the internal bearing ring and on the other side on the external bearing ring;
      each of the external bearing rings is seated in a bearing shell, which is fixed to the housing, and is supported on it in the axial direction; and
      sealing elements are provided between each of the internal bearing rings and the external bearing rings.

2. The device according to claim 1, wherein the bearing shell, which is fixed to the housing, comprises multiple parts.

3. The device according to claim 2, wherein each of the external bearing rings forms a labyrinth seal with the bearing shell, which is fixed to the housing.

4. The device according to claim 3, wherein at least one annular sealing element is positioned in the course of each labyrinth seal.

5. The device according to one of claims 1, 2, 3, or 4, wherein the internal diameter of the internal bearing ring is tailored to the smallest internal diameter of the external bearing ring and to the internal diameter of the filter drum.

6. The device according to one of claim 5, wherein the external bearing shell has a pressure connection for supplying filtered coolant to wash the space between the external bearing ring and the bearing shell, which is fixed to the housing.

7. The device according to one of claims 1, 2, 3, or 4, wherein the bearing shell has a pressure connection for supplying filtered coolant to wash the space between the external bearing ring and the bearing shell, which is fixed to the housing.

* * * * *